United States Patent [19]

Ohmori et al.

[11] Patent Number: 5,150,376
[45] Date of Patent: Sep. 22, 1992

[54] LASER SOURCE

[75] Inventors: Shigeru Ohmori, Osaka; Yoichi Sasai, Hirakata, both of Japan

[73] Assignee: Matsushita Electric Indutrial Co., Ltd., Osaka, Japan

[21] Appl. No.: 629,442

[22] Filed: Dec. 18, 1990

[30] Foreign Application Priority Data

Dec. 20, 1989 [JP] Japan .................................. 1-330515

[51] Int. Cl.$^5$ .............................................. H01S 3/08
[52] U.S. Cl. ...................... 372/107; 372/21; 372/22; 372/29; 372/33
[58] Field of Search ................ 372/21, 22, 33, 107, 372/29; 359/328; 385/14

[56] References Cited

U.S. PATENT DOCUMENTS

| | | | |
|---|---|---|---|
| 4,723,257 | 2/1988 | Baer et al. | 372/107 |
| 4,731,795 | 3/1988 | Clark et al. | 372/21 |
| 4,750,800 | 6/1988 | Fournier et al. | 350/96.11 |
| 4,973,118 | 11/1990 | Enomoto et al. | 307/427 |

OTHER PUBLICATIONS

Blue Light Source-Using Guilded-Wave Frequency Doubler with a Diode Laser G. Tohmon, K. Yamamoto; T. Taniuchi from Proceedings of SPIE (pp. 70–75). The International Society for Optical Engineers, vol. 898, Miniature Optics & Lasers, Jan. 11–12, 1988.

Primary Examiner—Georgia Y. Epps
Attorney, Agent, or Firm—Ratner & Prestia

[57] ABSTRACT

A laser source with small output fluctuations due to variations in ambient temperature. The frequency doubler, which has an optical waveguide formed on the substrate of its nonlinear optical crystal, and the laser generator are fixed on the same optical axis within the lens barrel. Moreover, the material used for the lens barrel has a thermal expansion coefficient which is substantially similar to that of the nonlinear optical crystal.

18 Claims, 5 Drawing Sheets

ENVIRONMENTAL TEMPERATURE (°C)

ENVIRONMENTAL TEMPERATURE (°C)

| MATERIAL | LiNbO$_3$ ($\perp$C) | STAINLESS STEEL (SUS316) | BRASS (C3046) | ALUMINIUM |
|---|---|---|---|---|
| THERMAL EXPANSION COEFFICIENT ($\times 10^{-7}$/°C) | 160 | 170 | 190 | 230 |

MOVING DISTANCE OF BEAM SPOT (μM)

LASER SOURCE

BACKGROUND OF THE INVENTION

The present invention relates to a laser source used in optical measurement or the like.

A structure of a conventional laser source is shown in FIG. 7. The composition and operation of this laser source are described below. (See G. Tohmon, K. Yamamoto and T. Taniuchi: Proc. SPIE Vol. 898, Miniature Optics and Lasers, 1988.) In the diagram, numeral 9 is a lens barrel made of aluminum; 6 is a frequency doubler having an optical waveguide 7 formed on a $LiNbO_3$ substrate adhered with resin to the end of the lens barrel 9; 1 is a laser diode, for generating a laser beam 2 with a wavelength of 0.84 μm, attached to the end of the lens barrel 9 opposite the frequency doubler 6; 3 is a collimating lens located on the side of the laser diode 1 from which the laser beam exits; 5 is a focusing lens positioned at the light input side of the frequency doubler 6; 4 is a half-wave plate positioned between the collimating lens 3 and the focusing lens 5; and 8 is an output laser beam emitted from the frequency doubler 6.

The operation of the conventional laser source of FIG. 7 is explained as follows. The laser beam 2, with a wavelength of 0.84 μm as emitted from the laser diode 1, enters the collimating lens 3 to form parallel rays. These rays then go into the focusing lens 5 after the deflection direction is corrected by the half-wave plate 4. The laser beam 2 leaving the focusing lens 5 is focused on the light input area of the $LiNbO_3$ frequency doubler 6 and propagates through the optical waveguide 7. Because the wavelength is converted to a half, the laser beam is delivered from the aluminum lens barrel 9 as an output laser beam 8 with a wavelength of 0.42 μm.

FIG. 8 shows the power variation of the output laser beam 8 when the focusing spot of laser beam 2 deviates along the depth of the optical waveguide 7 as the focusing spot of laser beam 2, which is focused by the focusing lens 5, enters the optical waveguide 7. The focusing spot location defined as zero on the horizontal axis is the location where the power of the output laser beam 8 becomes maximum. That location represents the optimum optical alignment of the focusing spot location.

FIG. 8 indicates that a very precise optical alignment is needed because a mere focusing spot deviation of ±0.33 μm causes a 50% power variation in the output laser beam 8.

FIG. 9 shows the environmental temperature characteristic of the output laser beam 8 for the conventional laser source shown in FIG. 7.

According to a study done by the present inventors, for a laser source having the configuration shown in FIG. 9, when the ambient temperature changes by ±10° C., the optical axis deviates under the strain caused by the difference in thermal expansion coefficient between the frequency doubler 6 and the aluminum lens barrel 9 and the power of the laser beam 8 decreases by 50% or more. Such an output drop caused by a change of only ±10° C. is a serious problem in actual use, and improvement has been required.

SUMMARY OF THE INVENTION

It is therefore a primary object of the present invention to provide a laser source with small output fluctuations due to variations in ambient temperature.

To achieve that object, the present invention fixes the frequency doubler, which has an optical waveguide formed on the nonlinear optical crystal, and the laser generator on the same optical axis within a lens barrel. The lens used to focus the laser beam emitted from the laser generator may also be fixed on that same optical axis within the lens barrel. Furthermore, the material used for the lens barrel has a thermal expansion coefficient equal or substantially similar to that of the nonlinear optical crystal.

With such a materials selection, the difference in the coefficient of thermal expansion between the frequency doubler and the lens barrel is reduced. Therefore, if the ambient temperature varies, the strain in the resin adhesive between the frequency doubler and the lens barrel is lessened, the deviation of the optical axis is reduced, and the output power of the laser source is stabilized.

DETAILED DESCRIPTION OF THE INVENTION

Figure 1:
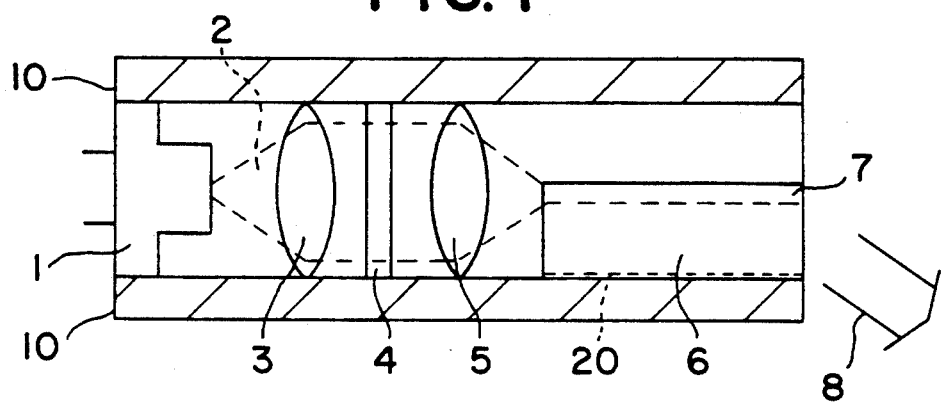
FIG. 1 is a sectional view of a laser source showing one embodiment of the present invention.

For three embodiments, the composition and operation of a laser source of the present invention are described below by referring to the drawings. The structure of the first embodiment is shown in FIG. 1. Numeral 10 is a lens barrel made of stainless steel, for example, SUS316, and 6 is a frequency doubler having an optical waveguide 7 formed in a $LiNbO_3$ substrate. Frequency doubler 6 is affixed to the lens barrel 10 with a resin 20. Numeral 1 is a laser diode for emitting a laser beam 2 with a wavelength of 0.84 μm, 3 is a collimating lens, 4 is a half-wave plate, and 5 is a focusing lens. Numeral 8 is an output laser beam emitted from the frequency doubler 6.

The operation of this embodiment is described below. The laser beam 2, with a wavelength of 0.84 μm as emitted from the laser diode 1, enters the collimating lens 3 to form parallel rays. These rays go into the focusing lens 5 after the deflection direction is corrected by the half-wave plate 4. The laser beam 2 leaving the focusing lens 5 is focused on the light input area of the $LiNbO_3$ frequency doubler 6 and propagates through the optical waveguide 7. The wavelength is converted to a half, then it is emitted from the lens barrel 10 as output laser beam 8 with a wavelength of 0.42 μm.

Figure 2:
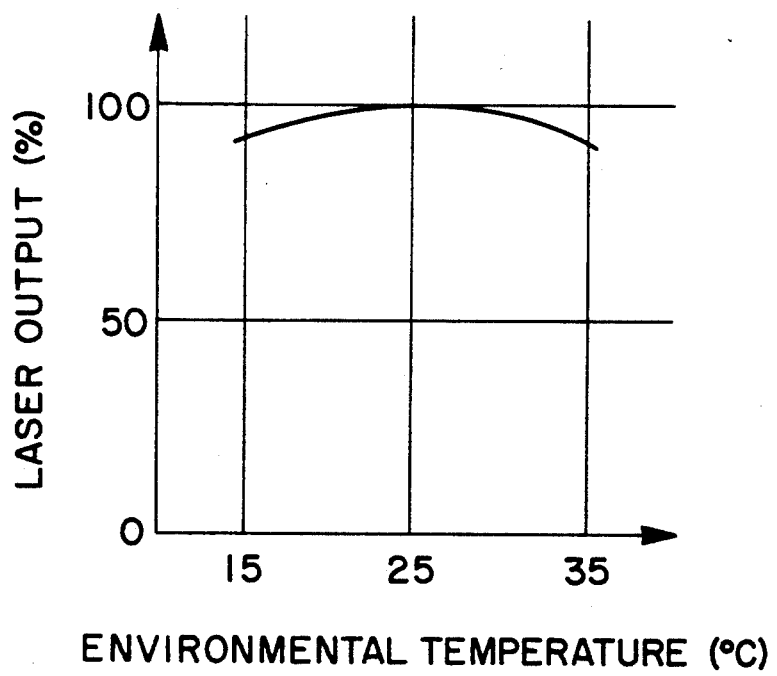
FIG. 2 is an output power temperature characteristic diagram for the laser source of FIG. 1.

FIG. 2 shows an environmental temperature characteristic of the output power of the laser source shown in FIG. 1. At 25°±10° C., the output lowering rate is 8%.

Thus, the present invention provides an excellent performance enhancement.

Figure 3:
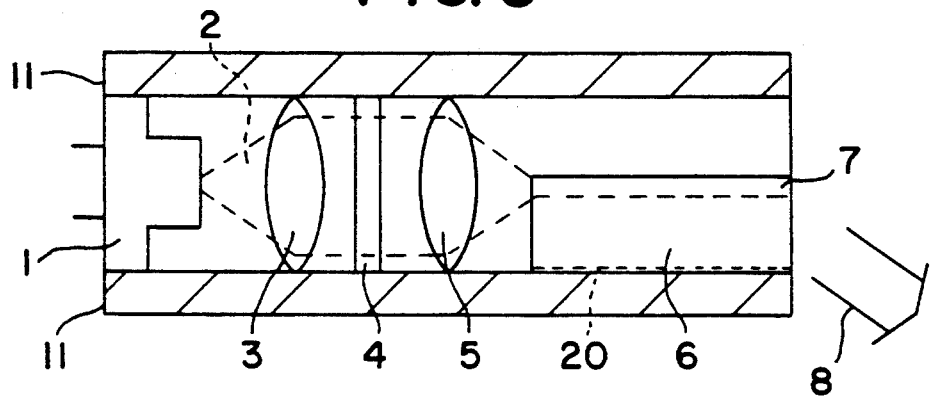
FIG. 3 is a sectional view of a laser source showing a second embodiment of the present invention.

For the second embodiment, the composition and operation of another laser source of the present invention are now explained. The structure is shown in FIG. 3. Numeral 11 is a lens barrel which is made of C3049, a brass, and 6 is a frequency doubler having an optical waveguide 7 on a LiNbO$_3$ substrate. Numeral 1 is a laser diode for generating laser beam 2 with a wavelength of 0.84 μm, 3 is a collimating lens, 4 is a half-wave plate, and 5 is a focusing lens. Numeral 8 is an output laser beam emitted from the frequency doubler 6.

The operation of the visible laser source of the embodiment shown in FIG. 3 is the same as for the first embodiment shown in FIG. 1.

Figure 4:
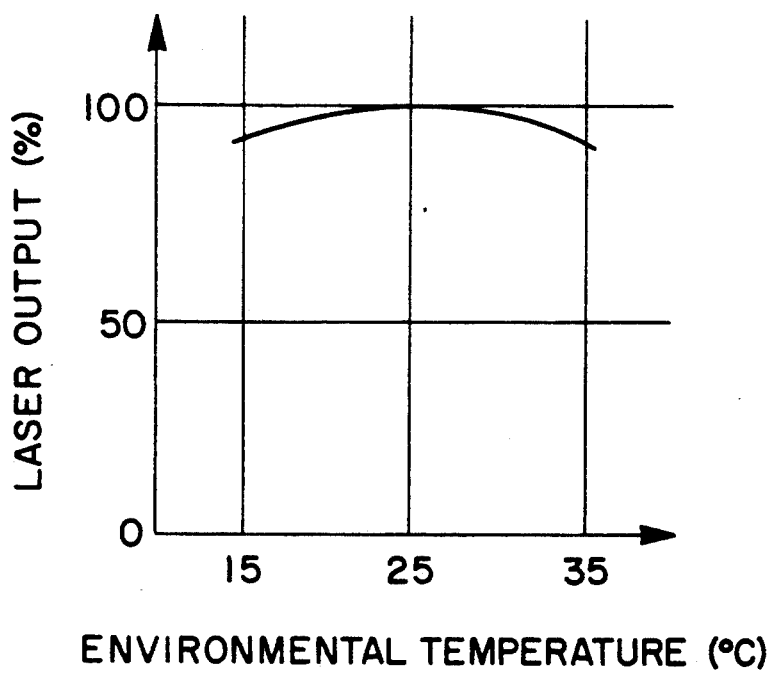
FIG. 4 is an output power temperature characteristic diagram for the laser source of FIG. 3.

FIG. 4 is an environmental temperature characteristic of the output power of the laser source shown in FIG. 3. At 25°±10° C., the output lowering rate is 10%. In this embodiment, too, a notable improvement is achieved.

Figures 5, 6:
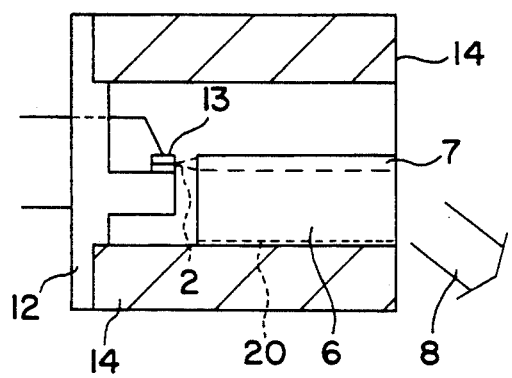
FIG. 5 is a sectional view of a laser source showing a third embodiment of the present invention.
FIG. 6 is a table listing the thermal expansion coefficients for the $LiNbO_3$ and the lens barrel materials.
Figure 7:
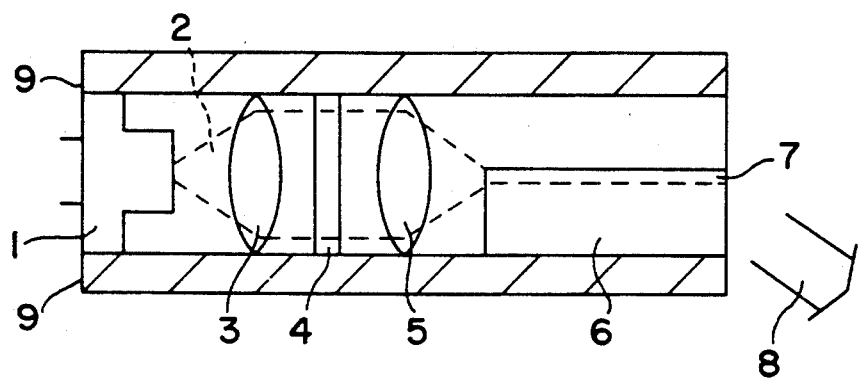
FIG. 7 is a sectional view of a conventional laser source.
Figure 8:
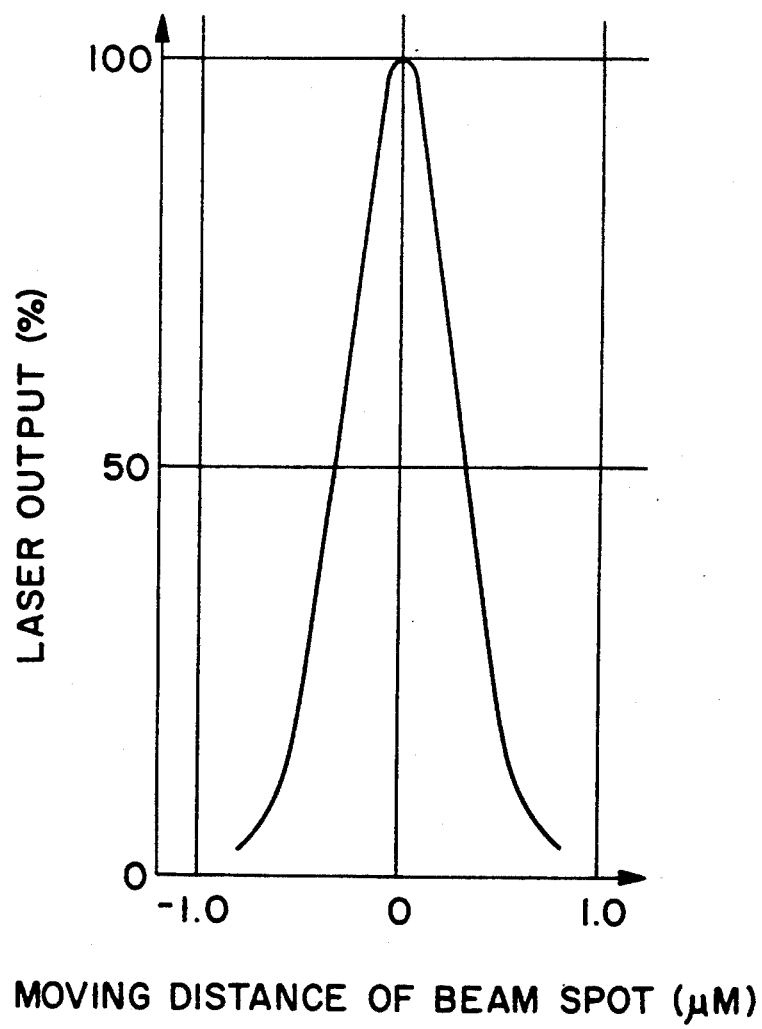
FIG. 8 is an output power characteristic diagram of the optical axial deviation for the conventional laser source.
Figure 9:
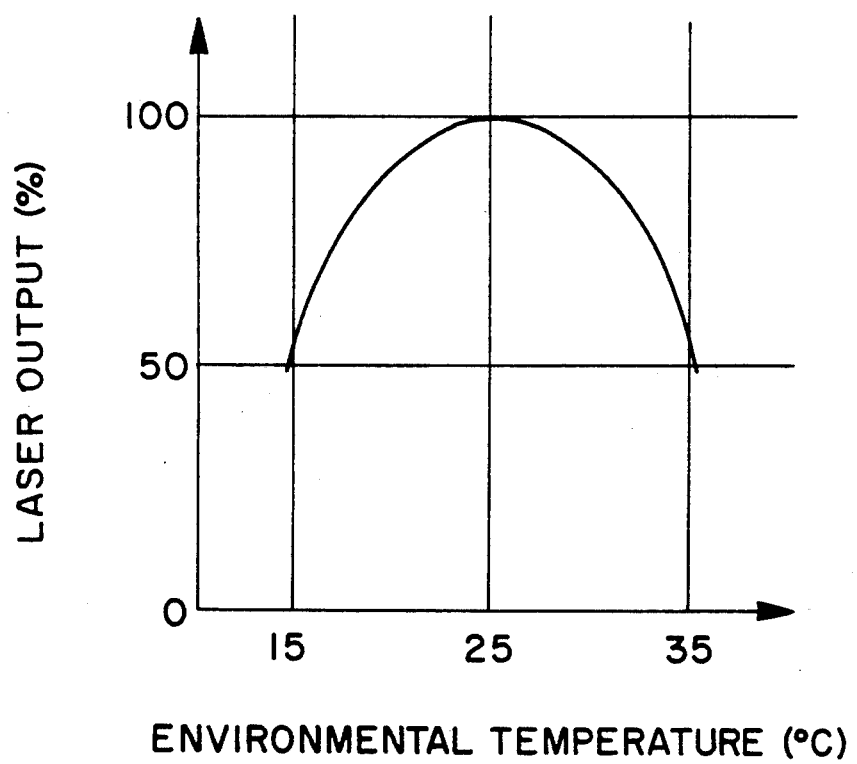
FIG. 9 is an output power temperature characteristic diagram for the conventional laser source.

For the third embodiment, the composition and operation of another laser source of the present invention are now explained. The structure is shown in FIG. 5. Numeral 14 is a lens barrel made of stainless steel, for example, SUS316, and 6 is a frequency doubler, having an optical waveguide 7 formed in a LiNbO$_3$ substrate, which is affixed to the lens barrel 14 with a resin 20. Numeral 13 is a laser diode chip for emitting a laser beam 2 with a wavelength of 0.84 μm and 12 is a mount to affix the laser diode chip 13.

The operation of the third embodiment is described below. The laser beam 2 with a wavelength of 0.84 μm as emitted from the laser diode chip 13 enters the optical waveguide 7 of the LiNbO$_3$ frequency doubler 6. The wavelength is converted to a half and is emitted from the stainless steel lens barrel 14 as the output laser beam 8 of a 0.42 μm wavelength.

Although stainless steel is used as the material for the lens barrel, another material can be used, such as brass, as long as the thermal expansion coefficient of the LiNbO$_3$ substrate is close to that of the material used for the lens barrel.

FIG. 6 shows the thermal expansion coefficient of the materials for both the LiNbO$_3$ substrate and the lens barrel used in the examples shown in FIGS. 1, 3, and 5. Stainless steel and brass have values quite close to the nonlinear optical crystal LiNbO$_3$, which shows they are suitable materials for a lens barrel.

Although LiNbO$_3$ is used as the nonlinear optical crystal in the examples, MgO:LiNbO$_3$ (MgO-doped LiNbO$_3$), KTP (KTiOPO$_4$), and quartz can be used as well.

Thus, because the thermal strain in the adhesive between the frequency doubler using LiNbO$_3$ and the lens barrel is reduced, an unexpectedly large enhancement of the frequency doubler output is achieved, contributing to the efficiency of this type of laser source.

As explained herein, according to the present invention, the output power variations due to environmental temperature changes of the laser source created in the lens barrel are reduced. Consequently, the practical effect of the laser source is greatly enhanced; it has an increased efficiency.

What is claimed:

1. A laser source comprising:
   a lens barrel composed of a first material and having an optical axis disposed therein;
   a frequency doubler positioned within said lens barrel and having:
   (a) a nonlinear optical crystal adhered directly to said lens barrel, and
   (b) an optical waveguide formed on said nonlinear optical crystal along said optical axis,
   said frequency doubler composed of a second material which has a thermal expansion coefficient substantially similar to the thermal expansion coefficient of said first material of said lens barrel; and
   a laser generator positioned within said lens barrel along said optical axis for emitting a laser beam, said laser beam passing through said optical waveguide of said frequency doubler before exiting said lens barrel.

2. A laser source as claimed in claim 1 further comprising a lens positioned along said optical axis within said lens barrel for focusing said laser beam emitted from said laser generator.

3. A laser source as claimed in claim 2 wherein said nonlinear optical crystal of said frequency doubler is LiNbO$_3$.

4. A laser source as claimed in claim 3 wherein said lens barrel is stainless steel.

5. A laser source as claimed in claim 3 wherein said lens barrel is brass.

6. A laser source as claimed in claim 2 wherein said nonlinear optical crystal of said frequency doubler is KTiOPO$_4$.

7. A laser source as claimed in claim 2 wherein said nonlinear optical crystal of said frequency doubler is quartz.

8. A laser source as claimed in claim 1 wherein said nonlinear optical crystal of said frequency doubler is LiNbO$_3$.

9. A laser source as claimed in claim 8 wherein said lens barrel is stainless steel.

10. A laser source as claimed in claim 8 wherein said lens barrel is brass.

11. A laser source as claimed in claim 1 wherein said nonlinear optical crystal of said frequency doubler is KTiOPO$_4$.

12. A laser source as claimed in claim 1 wherein said nonlinear optical crystal of said frequency doubler is quartz.

13. A laser source comprising:
   a stainless steel lens barrel having an optical axis disposed therein;
   a frequency doubler positioned within said lens barrel and having:
   (a) a LiNbO$_3$ crystal adhered directly to said lens barrel, and
   (b) an optical waveguide formed on said LiNbO$_3$ crystal along said optical axis; and
   a laser generator positioned with said lens barrel along said optical axis for emitting a laser beam, said laser beam passing through said optical waveguide of said frequency doubler before exiting said lens barrel.

14. A laser source as claimed in claim 13 further comprising a lens positioned along said optical axis, within said lens barrel, and between said laser generator and said frequency doubler for focusing said laser beam emitted from said laser generator.

15. A laser source as claimed in claim 13 wherein said frequency doubler has a thickness which is substantially similar to the thickness of said lens barrel.

16. A laser source comprising:

a brass lens barrel having an optical axis disposed therein;
a frequency doubler positioned within said lens barrel and having:
 (a) a LiNbO$_3$ crystal adhered directly to said lens barrel, and
 (b) an optical waveguide formed on said LiNbO$_3$ crystal along said optical axis; and
a laser generator positioned within said lens barrel along said optical axis for emitting a laser beam, said laser beam passing through said optical waveguide of said frequency doubler before exiting said lens barrel.

17. A laser source as claimed in claim 16 further comprising a lens positioned along said optical axis, within said lens barrel, and between said laser generator and said frequency doubler for focusing said laser beam emitted from said laser generator.

18. A laser source as claimed in claim 16 wherein said frequency doubler has a thickness which is substantially similar to the thickness of said lens barrel.

* * * * *